United States Patent [19]

Turchan

[11] Patent Number: 4,651,374
[45] Date of Patent: Mar. 24, 1987

[54] COMBINED HOLE MAKING AND THREADING TOOL

[76] Inventor: Manuel C. Turchan, 12825 Ford Rd., Dearborn, Mich. 48126

[21] Appl. No.: 840,443

[22] Filed: Mar. 17, 1986

[51] Int. Cl.⁴ .............................................. B23G 5/20
[52] U.S. Cl. .................................. 10/140; 10/141 R; 408/222; 409/74
[58] Field of Search ........................ 409/74, 77, 65, 66; 408/218, 219, 220, 222; 72/71; 10/140, 141 R

[56] References Cited

U.S. PATENT DOCUMENTS

| 279,360 | 6/1883 | Douglas | 408/218 X |
| 1,034,724 | 8/1912 | Mueller | 10/140 X |
| 2,286,477 | 6/1942 | Falls | 409/74 |
| 3,258,797 | 7/1966 | Budd | 10/152.7 |
| 4,271,554 | 6/1981 | Grenell | 10/140 |
| 4,375,708 | 3/1983 | Hellnick | 408/219 |

FOREIGN PATENT DOCUMENTS

| 2427616 | 12/1975 | Fed. Rep. of Germany | 10/140 |
| 55-24862 | 2/1980 | Japan | 408/222 |

Primary Examiner—William R. Briggs
Attorney, Agent, or Firm—Reising, Ethington, Barnard, Perry & Milton

[57] ABSTRACT

A combination tool is disclosed for drilling a hole in a workpiece on the inward feed of the tool and for threading the hole during retraction of the tool. The tool comprises a straight body with a drill point at the forward end, a shank at the rearward end and a thread-form mill between the drill point and the shank.

7 Claims, 4 Drawing Figures

COMBINED HOLE MAKING AND THREADING TOOL

FIELD OF THE INVENTION

This invention relates to tools; more particularly, it relates to a tool for making a threaded hole in metal and other materials.

BACKGROUND OF THE INVENTION

In machining of metals and other materials, there are many applications where it is desirable to make a hole and thread it with a single tool. The single tool for hole making and threading is needed not only for through holes but also for blind holes in a workpiece. The advantage of such a tool is that it reduces the number of motions or operations required to produce a threaded hole; it is especially advantageous in conjunction with high speed machining operations.

In the prior art, it is known to use a single tool for drilling a hole and forming internal threads by swaging or coining the metal. A tool of this kind is disclosed in the Barth U.S. Pat. No. 2,703,419 granted Mar. 8, 1955 which describes a swaging tap having a drill or end mill on the leading end thereof to cut the hole which is to be threaded. This tool is rotated and the hole is cut and threaded on the inward feed of the tool and the tool is unscrewed from the threaded hole. A similar tool is disclosed in the Grenell U.S. Pat. No. 4,271,554 granted June 9, 1981. In tools of this kind, the maximum diameter of the swaging tap must be larger than the maximum diameter of the drill or end mill. Further, as described in the Grenell patent, the minor diameter of the female threads is smaller than the diameter of the drilled hole and the major diameter of the threads is larger than the diameter of the drilled hole.

A general object of this invention is to provide a combined hole making and threading tool which may be used for both through holes and blind holes and which lends itself to high speed machining.

SUMMARY OF THE INVENTION

In accordance with this invention, a tool is provided for making a hole in a workpiece on the inward feed of the tool and for threading the hole during retraction of the tool or alternatively during further inward feed of the tool. This is accomplished by a tool comprising an elongated straight body with a shank at one end, a hole making means at the other end and a thread making means intermediate the ends. The hole making means, such as a drill point, is operative by rotation about the tool axis and the thread making means, such as a thread-form mill, is operative by helical motion of the tool combined with rotation about the tool axis. The thread making means has a maximum diameter equal to the maximum diameter of the hole making means whereby the thread making means can enter the hole without interference. Further, the invention comprises a tool having a thread making means for making female threads with a crest or minor diameter no smaller than the diameter of the hole formed by the hole making means. Further, the invention comprises a thread-form mill. Further, the body of the tool includes a chip removal passage.

A complete understanding of this invention may be obtained from the detailed description that follows taken with the accompanying drawings.

BEST MODE FOR CARRYING OUT THE INVENTION

Figure 1:
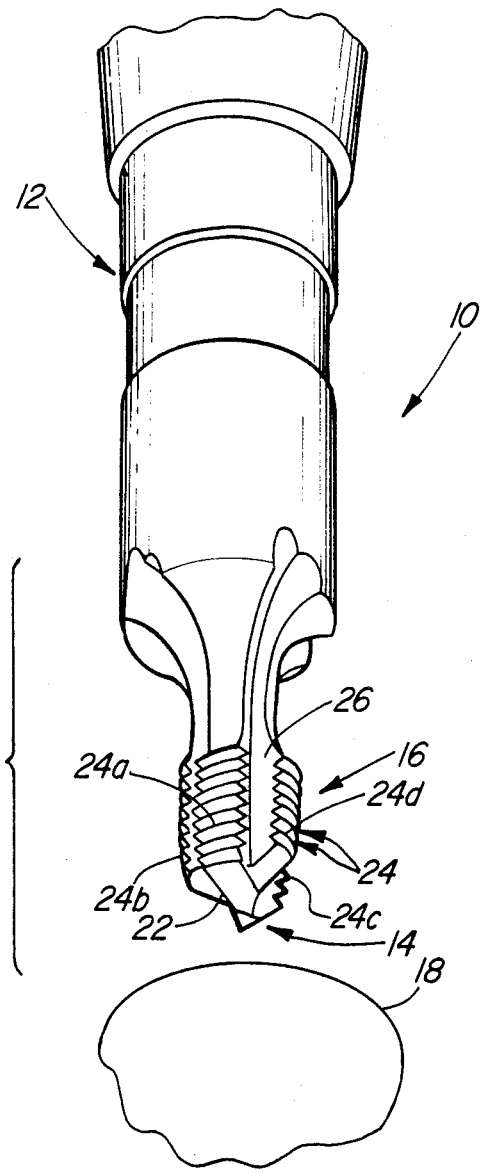
FIG. 1 is a perspective view of the tool of this invention.

Referring now to the drawings, there is shown an illustrative embodiment of the invention in a combination tool comprising a drill point and a thread-form mill for hole making and thread making. It will be appreciated as the description proceeds that the inventive tool may be embodied in different forms for use in a wide variety of applications.

The tool 10 of this invention is shown in a perspective view in FIG. 1. It comprises, in general, an elongated rectilinear body including a shank 12 at one end which is provided with a suitable fitting, of conventional design, for engagement by a tool holder of a machine tool. The tool 10 also comprises the hole making means in the form of a drill point 14 at the forward end and a thread making means, in the form of a thread-form mill 16 intermediate the drill point 14 and the shank 12. The tool 10 is made of a material selected in accordance with the selected workpiece application and is suitably formed as a unitary body.

Figure 2:
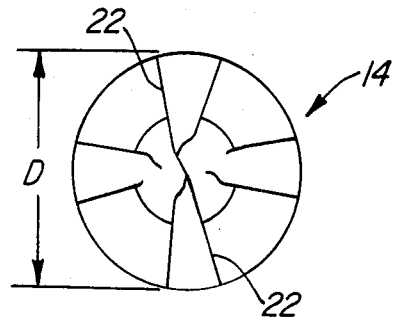
FIG. 2 is an end view of the forward end of the tool.

The drill point 14 at the forward end of the tool is of known design having a pair of cutting edges 22, as shown in FIGS. 1 and 2. The drill point 14 has a maximum diameter D and is adapted for right hand or clockwise rotation about the tool axis for hole drilling in a conventional manner.

The thread-form mill 16 is provided with a multiplicity of thread-form cutters 24 in a conventional manner. The tool has one or more flutes 26 extending from the drill point throughout the thread-form mill for the purpose of chip removal. Also, the tool is provided with a coolant passage 28 with branch passages 28a for supply of liquid under pressure to the drill point and to aid in chip removal.

In the thread-form mill 16, each of the cutters 24 is of annular configuration and the number of cutters 24 is preferably equal to or greater than the number of threads to be cut. Each cutter 24 comprises a number of cutter seqments 24a, 24b, 24c and 24d which are circumferentially aligned and are separated by the intervening flutes. Each cutter segment has a cutting edge disposed on the leading end thereof in accordance with the direction of cutting rotation. The thread-form mill 16 is adapted for right hand or clockwise rotation for cutting threads. The cutter segments of the thread-form mill have a maximum crest diameter which is equal to the maximum diameter of the drill point 14.

Figure 3:
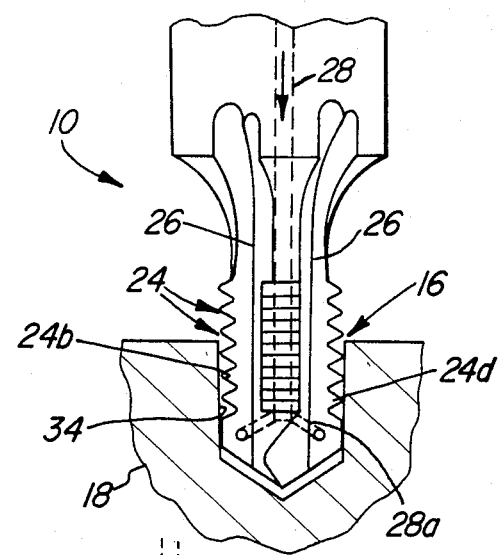
FIG. 3 depicts the tool during drilling a hole in a workpiece.
Figure 4:
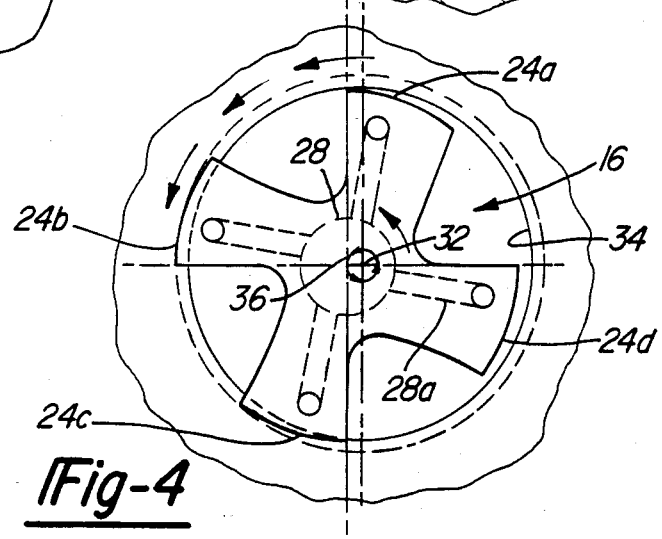
FIG. 4 depicts the tool during milling of threads in the workpiece.

The tool 10 may be used in any CNC (computerized numerically controlled) machining center. Also, it may be used in a special machine tool adapted for using the tool of this invention. The hole making and thread making operations are as follows. For hole making, as shown in FIG. 3, the tool is rotated at the desired speed about its own longitudinal axis and the drill point 14 is advanced into the workpiece at the desired feed rate. When the desired hole depth is achieved, the feed is stopped but the tool rotation is continued. The axis 32 of the drilled hole 34 is indicated in FIG. 4. The tool is backed off sufficiently to provide the desired clearance for the drill point. Then, with the rotation continuing in the same direction, the thread milling portion of the cycle is commenced by imparting helical motion to the tool in the retracting direction. The longitudinal axis of the tool describes an orbital path 36 around the axis 32 of the drilled hole as shown in FIG. 4. While the tool 10 is rotated about its own longitudinal axis and moved in the orbital path 36, it is retracted axially to generate the helical motion to cut the desired threads. The tool executes one orbital revolution during axial retraction corresponding to one thread pitch. Preferably, more than one orbital revolution is imparted to the tool, for example about one and one-half revolutions, to ensure clean-cut threads. After the orbital motion is complete the tool is moved to align the axis thereof with the hole axis and then it is withdrawn. The same tool may be used for cutting left hand threads by imparting counterclockwise orbital motion to it.

Although the description of this invention has been given with reference to a particular embodiment, it is not to be construed in a limiting sense. Many variations and modifications will now occur to those skilled in the art. For a definition of the invention reference is made to the appended claims.

What is claimed is:

1. For use in a machine tool which is adapted to rotate a cutting tool about its axis and feed the cutting tool axially for cutting a hole in a workpiece and adapted to simultaneously rotate said cutting tool about its axis, move the axis in an orbital path and move the cutting tool axially whereby a point on the cutting tool defines a helical path, a hole making and threading tool comprising:

an elongated straight body having a shank at one end, a hole making means at the other end and a thread making means intermediate said ends, and at least one chip removal passage extending from said hole making means through said thread making means, said thread making means having a uniform maximum diameter equal to the maximum diameter of said hole making means whereby said thread making means can enter the hole made by the hole making means without interference.

2. The invention as defined in claim 1 wherein said hole making means is a drill.

3. The invention as defined in claim 1 wherein said thread making means is a thread-form mill.

4. The invention as defined in claim 1 wherein said hole making means is a drill and said thread making means is a thread-form mill.

5. The invention as defined in claim 1 wherein said hole making means comprises a drill point, and said thread making means comprises a thread-form mill having a plurality of thread-form cutters.

6. The invention as defined in claim 1 wherein said thread making means is a thread-form mill for making female threads having a minimum diameter no smaller than the diameter of said hole.

7. For use in a machine tool which is adapted to rotate a cutting tool about its axis and feed the cutting tool axially for cutting a hole in a workpiece and adapted to simultaneously rotate said cutting tool about its axis, move the axis in an orbital path and move the cutting tool axially whereby a point on said cutting tool defines a helical path, a hole cutting and threading tool comprising:

an elongated body having a shank at one end adapted to be held by said machine tool, a hole cutter at the other end, and an axially extending thread-form mill intermediate said shank and said hole cutter, and at least one chip removal passage extending from said hole cutter through said thread-form mill, said thread-form mill having a uniform maximum diameter equal to the maximum diameter of said hole cutter whereby said thread-form mill can enter a hole made by said hole cutter without interference.

* * * * *